United States Patent
Seo et al.

(10) Patent No.: US 8,380,215 B2
(45) Date of Patent: Feb. 19, 2013

(54) METHOD AND APPARATUS OF SCHEDULING IN MULTI-CELL COOPERATIVE WIRELESS COMMUNICATION SYSTEM

(75) Inventors: Han Byul Seo, Anyang-si (KR); Byoung Hoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/125,969

(22) PCT Filed: Dec. 3, 2009

(86) PCT No.: PCT/KR2009/007196
§ 371 (c)(1),
(2), (4) Date: Apr. 25, 2011

(87) PCT Pub. No.: WO2010/064856
PCT Pub. Date: Jun. 10, 2010

(65) Prior Publication Data
US 2011/0223928 A1    Sep. 15, 2011

(30) Foreign Application Priority Data

Dec. 5, 2008  (KR) ................. 10-2008-0122846

(51) Int. Cl.
*H04W 72/00*  (2009.01)

(52) U.S. Cl. ........ 455/452.1; 455/63.4; 455/25
(58) Field of Classification Search ........... 455/63.4, 455/25, 450
See application file for complete search history.

(56) References Cited

U.S. PATENT DOCUMENTS

| 2007/0004416 | A1 | 1/2007 | Nishimura et al. | |
| 2009/0131096 | A1* | 5/2009 | Chen et al. | 455/522 |
| 2010/0130223 | A1* | 5/2010 | Liao et al. | 455/453 |

FOREIGN PATENT DOCUMENTS

| WO | 2007/138664 | 12/2007 |
| WO | 2007/145461 | 12/2007 |

* cited by examiner

*Primary Examiner* — Vladimir Magloire
(74) *Attorney, Agent, or Firm* — Lee, Hong, Degerman, Kang & Waimey

(57) ABSTRACT

A method and an apparatus of scheduling in a multi-cell cooperative wireless communication system is provided. Scheduling is performed, and scheduling results are transmitted to a neighbor base station (BS). The scheduling results comprise certain information for scheduling to be sequentially performed among base stations. Inter-cell interference can be reduced and scheduling can be performed simply by exchanging signals without a central scheduler.

5 Claims, 6 Drawing Sheets

[Fig. 1]
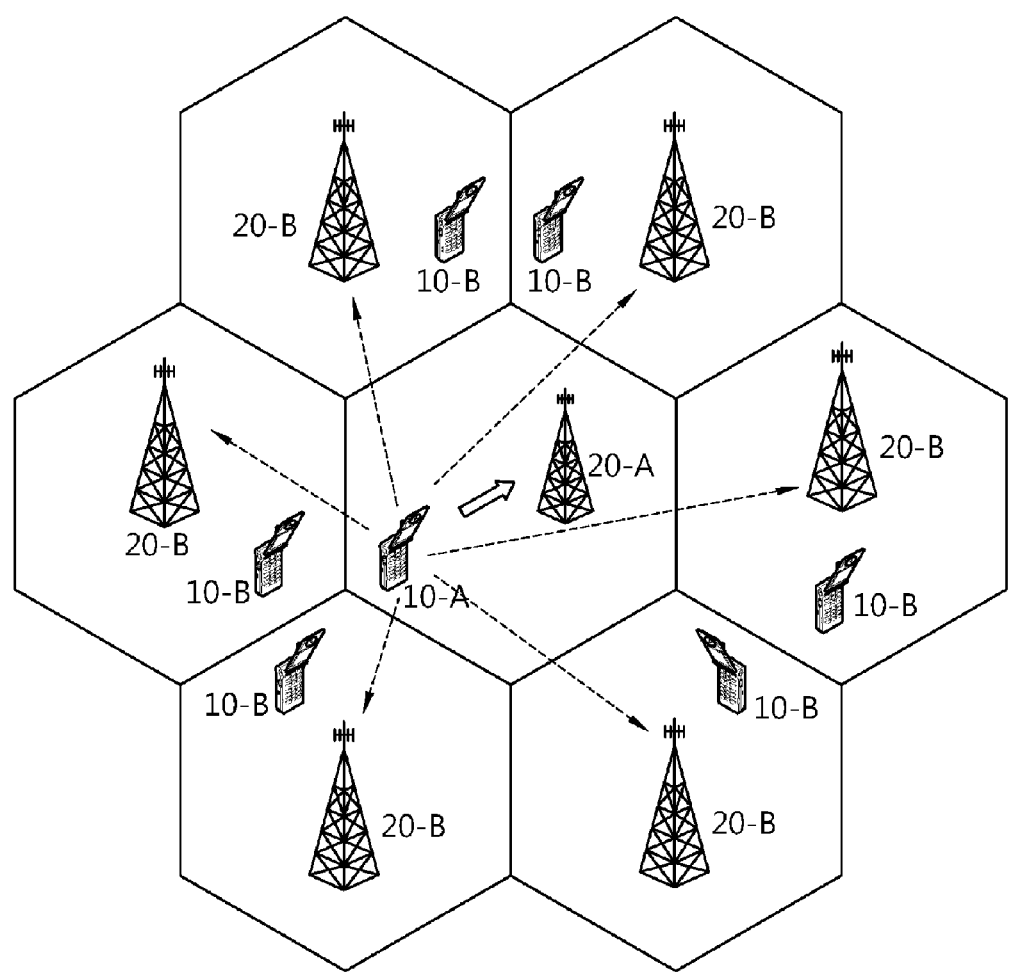

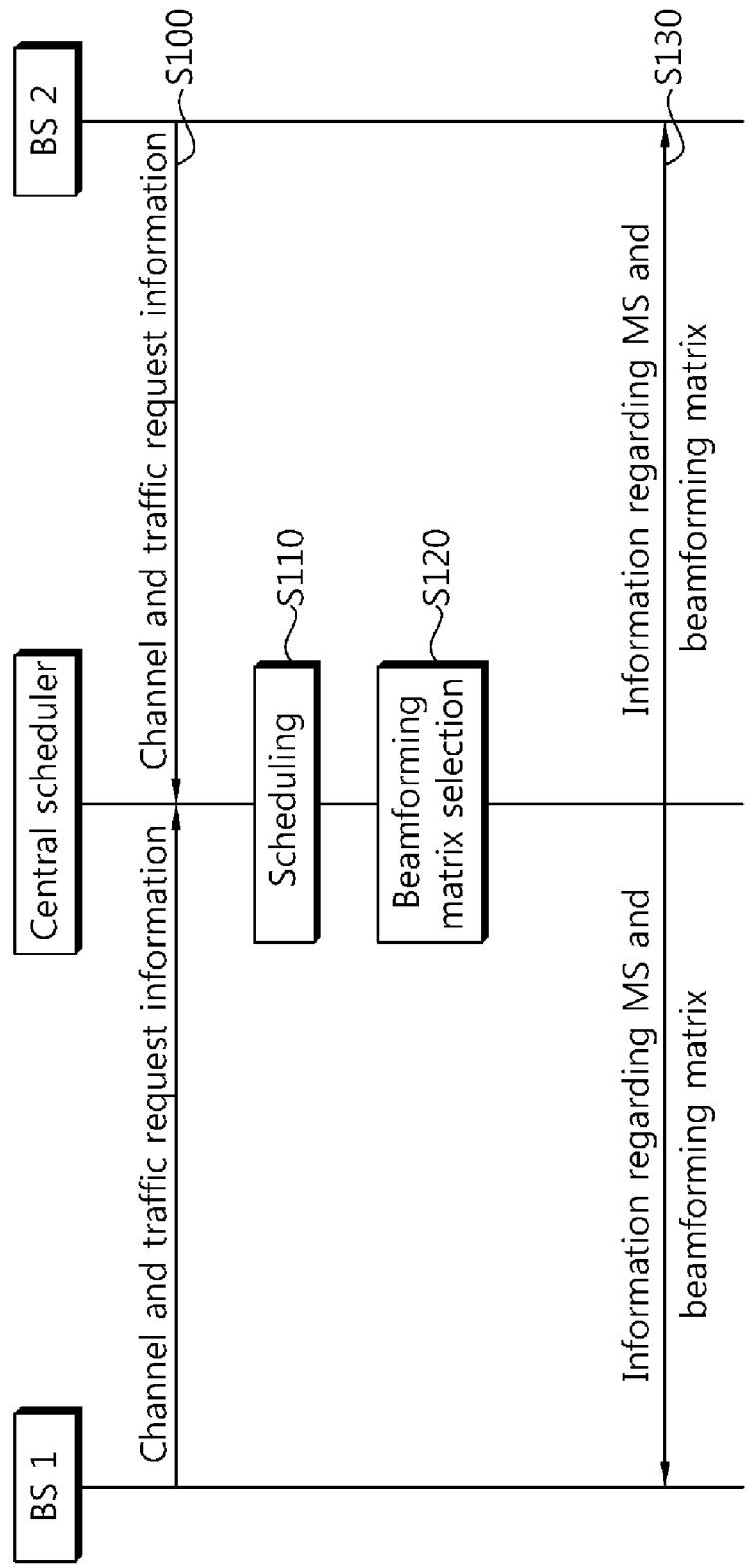
[Fig. 2]

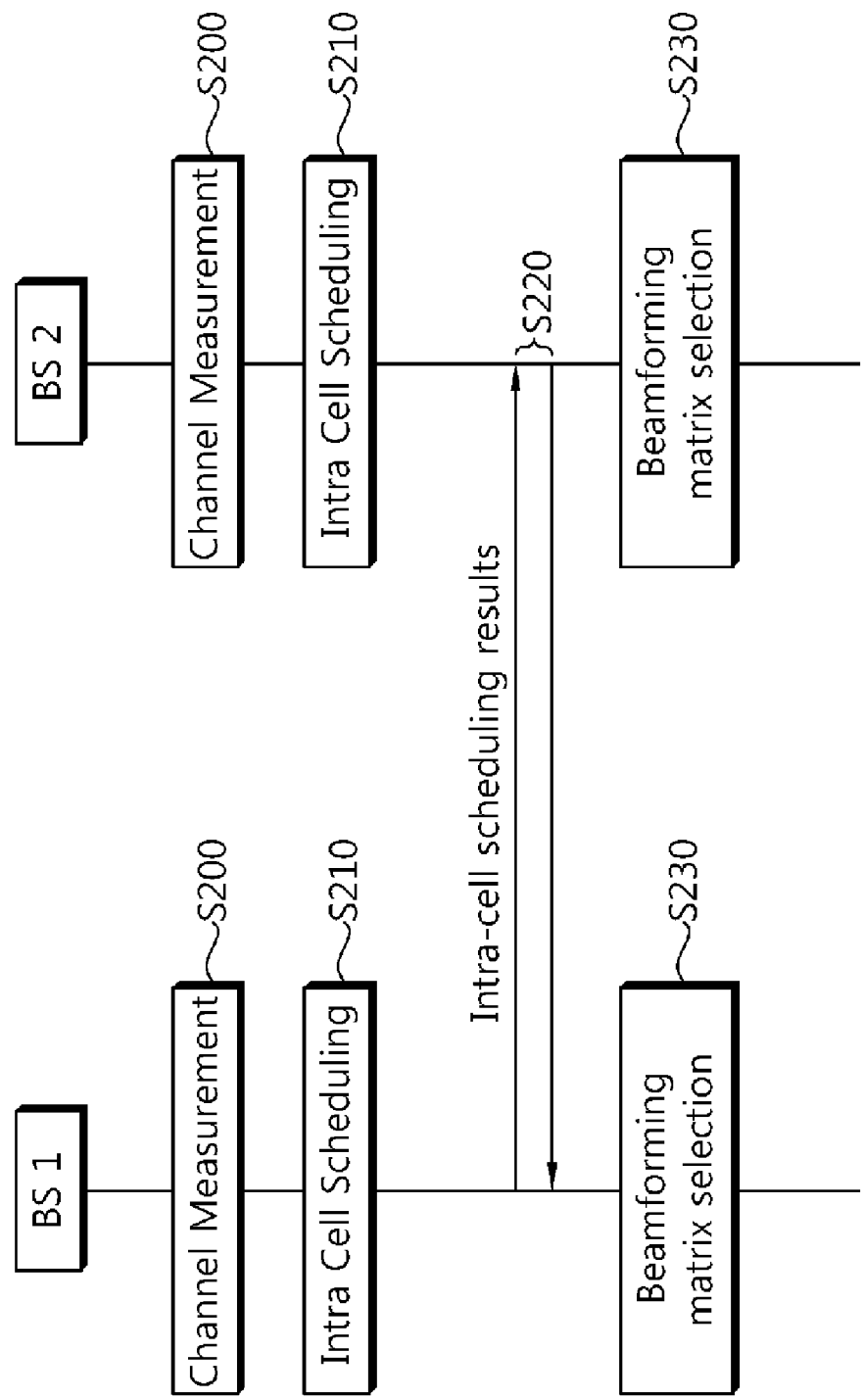
[Fig. 3]

[Fig. 4]
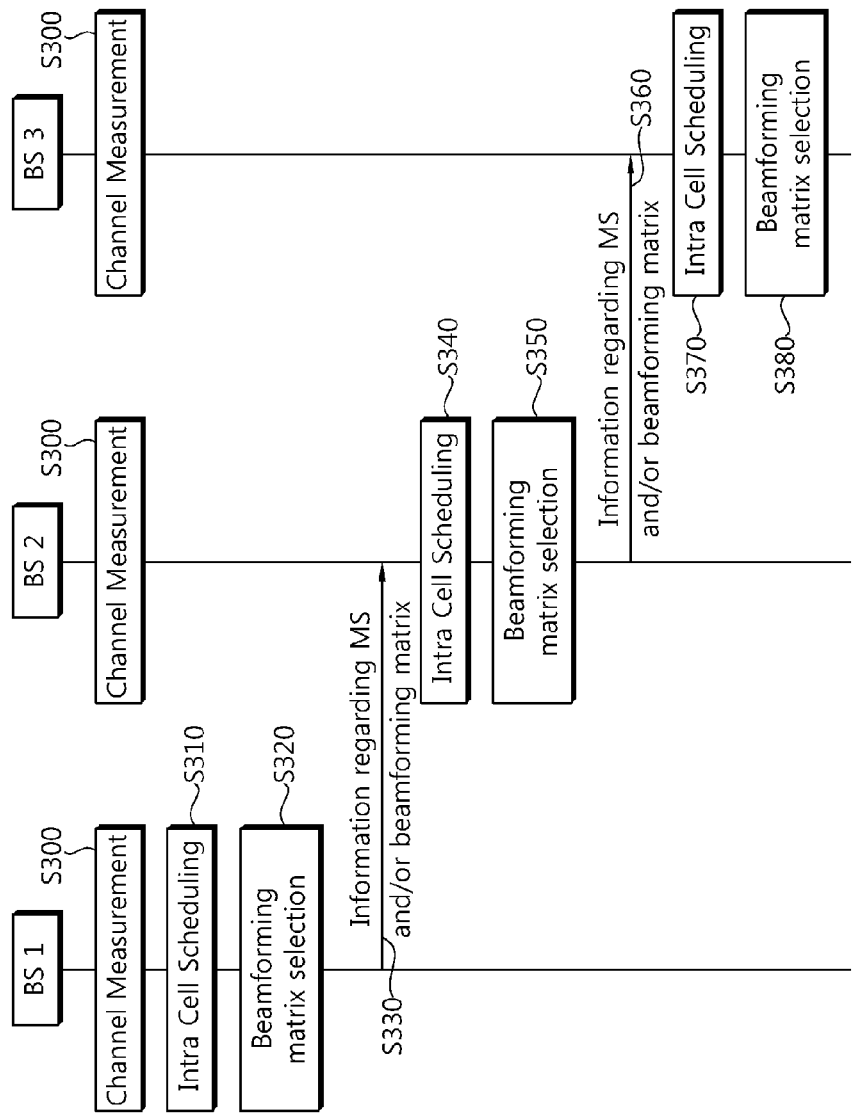
[Fig. 5]
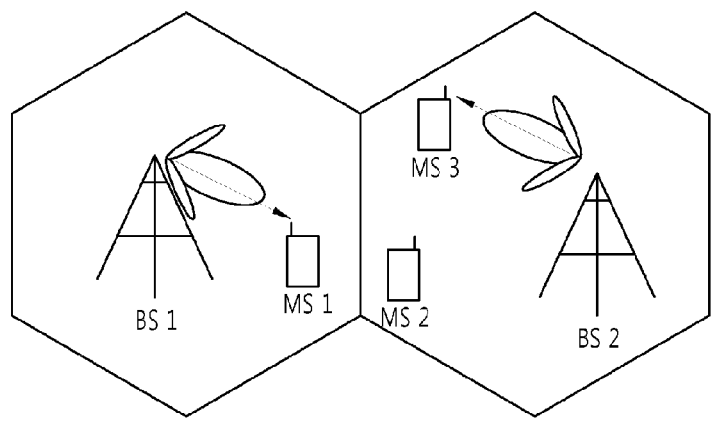

[Fig. 6]
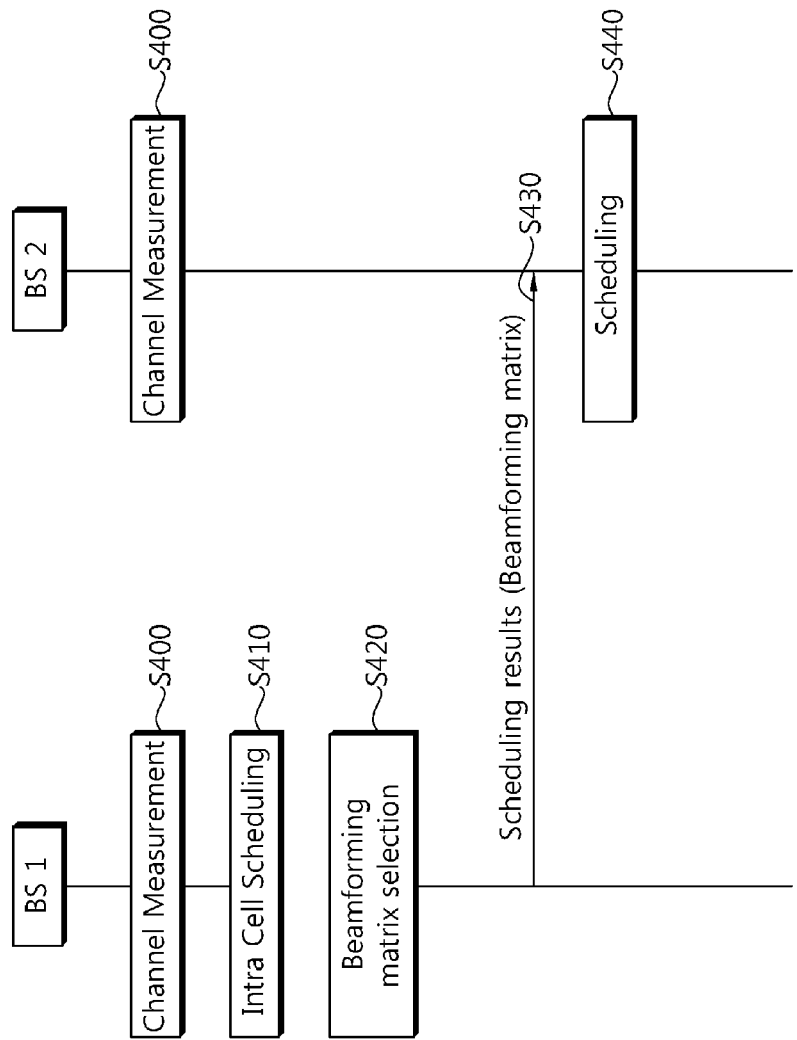
[Fig. 7]
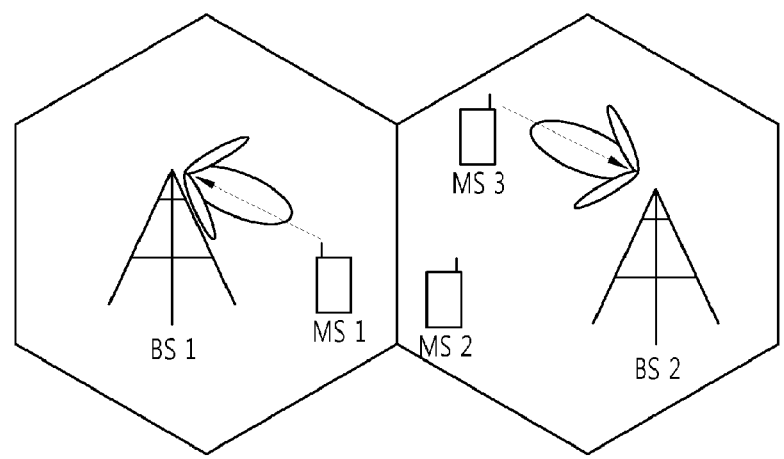

[Fig. 8]
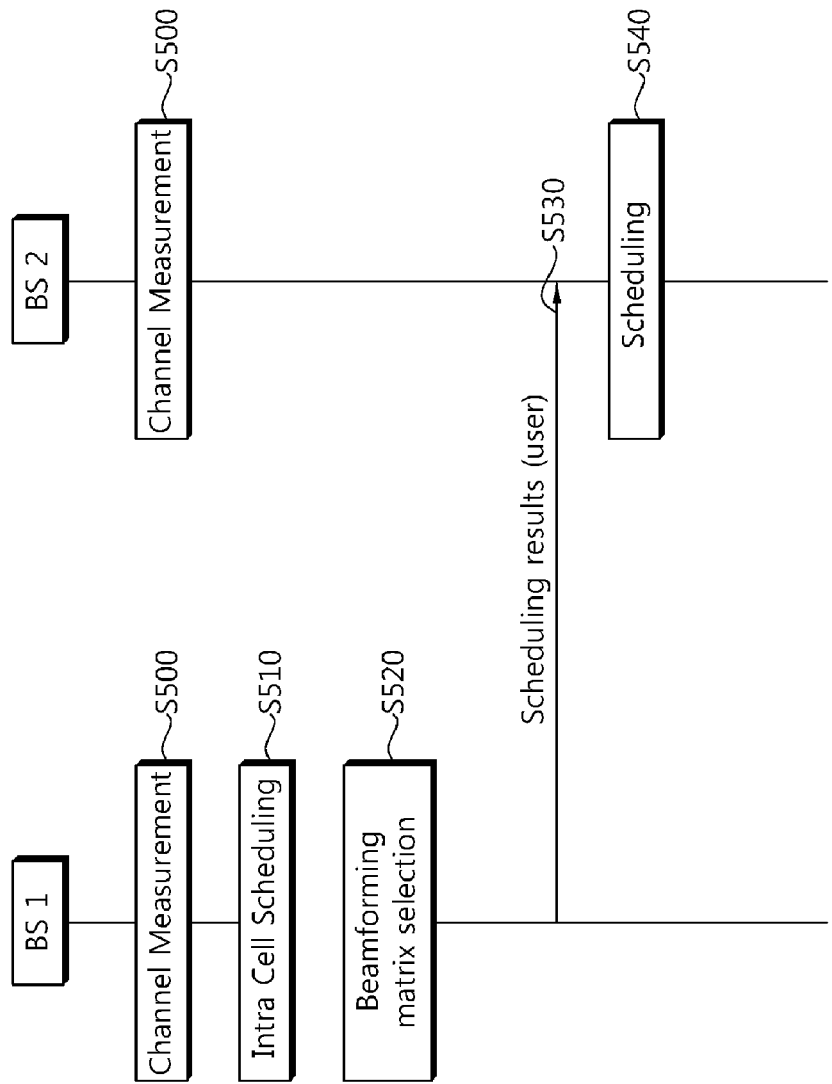
[Fig. 9]
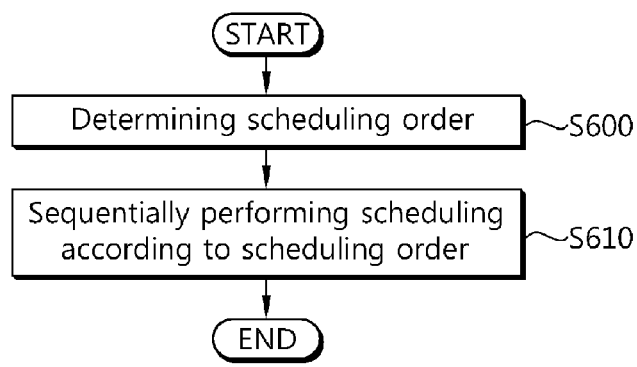

METHOD AND APPARATUS OF SCHEDULING IN MULTI-CELL COOPERATIVE WIRELESS COMMUNICATION SYSTEM

CROSS-REFERENCE TO RELATED APPLICATIONS

This application is a 371 U.S. national stage application of International Application No. PCT/KR2009/007196, filed on Dec. 3, 2009, which claims the benefit of earlier filing date and right of priority to Korean Application No. 10-2008-0122846, filed on Dec. 5, 2008, the contents of which is incorporated by reference herein in its entirety.

TECHNICAL FIELD

The present invention relates to wireless communication and, more particularly, to a method and an apparatus of scheduling in a multi-cell cooperative wireless communication system.

BACKGROUND ART

The next-generation multimedia wireless communication system, on which research is actively ongoing, is requested to process various information such as image data, radio data, and the like, beyond the early voice-oriented services, at a high data transmission rate.

Recently, orthogonal frequency division multiplexing (OFDM) supporting a high data transmission rate receives much attention. The OFDM is a multi-carrier modulation scheme in which a frequency band is divided into a plurality of orthogonal subcarriers to transmit data. Orthogonal frequency division multiple access (OFDMA) is a scheme providing multiplexing of multiple users by combining frequency division multiple access (FDMA), time division multiple access (TDMA), or code division multiple access (CDMA) to the OFDM.

A wireless communication system includes a base station (BS) and one or more mobile stations (MSs). MSs may be fixed or mobile, and may be referred to by other names such as user equipment (UE), user terminal (UT), subscriber station (SS), wireless device, etc. The BS generally refers to a fixed station that communicates with the MSs and may be called by other names such as node B, base transceiver system (BTS), access point (AP), etc. In the following description, uplink (UL) refers to transmission from the MSs to the BS, and downlink (DL) refers to transmission from the BS to the MSs.

The wireless communication system has a cell structure to configure an effective system. Cells refer to zones formed as a large area is divided in order to effectively use frequency. In general, a BS is installed in a central portion of a cell to relay MSs, and the cell refers to a service area provided by the single BS.

When neighboring cells in the OFDM/OFDMA system in a multi-cell environment use the same subcarrier, it potentially causes interference between users. This is called an inter-cell interference. In particular, the inter-cell interference is much problematic to an MS located near a cell boundary. In downlink, an MS located near the cell boundary is strongly affected by a neighboring cell. In uplink, an MS located near the cell boundary strongly affects a neighboring cell and has a low transmission rate due to a path loss in its serving cell.

In order to reduce the inter-cell interference, neighboring cells may use different sub-carriers, which, however, causes a problem in that radio resources used by the single BS are reduced.

Thus, in order to reduce the inter-cell interference in the multi-cell environment, a multi-cell cooperative method has been proposed. The use of the multi-cell cooperative method can improve a communication performance of the MS located near the cell boundary. In line with this, an effective scheduling method of a BS using the multi-cell cooperative method is required.

DISCLOSURE OF INVENTION

Technical Problem

The present invention provides a method and an apparatus of scheduling for enhancing the efficiency in an inter-cell cooperation in a multi-cell cooperative wireless communication system.

Technical Solution

In an aspect, a method of scheduling in a multi-cell cooperative wireless communication system is provided. The method includes performing scheduling, and transmitting scheduling results to a neighbor base station (BS), wherein the scheduling results comprise certain information for scheduling to be sequentially performed among base stations. The certain information may comprise information of a beamforming matrix regarding a mobile station (MS) selected from the performing of scheduling. The certain information may further comprise information of a beamforming matrix desired to be selected by the neighbor BS. The certain information may further comprise information of a beamforming matrix desired not to be selected by the neighbor BS. The certain information may comprise a list of mobile stations desired to be selected by the neighbor BS. The certain information may comprise a list of mobile stations desired not to be selected by the neighbor BS. The list of mobile stations may be determined according to a method including measuring an uplink interference signal of a mobile station belonging to a neighboring cell, and storing information of a MS with an interference signal with a size larger than a threshold value. The information of the MS may comprise a mobile station ID, a reference signal ID, channel information, or a signal arrival direction. The list of mobile stations may be determined according to a method including calculating a channel correlation with a MS selected in the performing of scheduling by using the information of the MS, and selecting a MS that may cause degradation of performance beyond a certain range, if scheduling is performed on the same resource as the resource of the MS selected in the performing of scheduling.

In another aspect, a method of scheduling in a multi-cell cooperative wireless communication system is provided. The method includes receiving scheduling results from a neighbor base station (BS), and performing scheduling by using the scheduling results, wherein the scheduling results comprise certain information for scheduling to be sequentially performed among base stations. The method may further include transmitting results obtained from the scheduling to a different neighbor BS.

In another aspect, a method of scheduling in a multi-cell cooperative wireless communication system is provided. The method includes determining a scheduling order of two or more base stations, and performing scheduling according to the determined scheduling order, wherein, in performing scheduling, a BS coming later in the scheduling order uses scheduling results of a BS coming before in the scheduling order. The scheduling order may be changed over time. The scheduling order may be cyclically shifted. The scheduling order may be changed in consideration of a traffic load. The scheduling order may be changed in consideration of the preference order. The determining of the scheduling order may include requesting, by a first BS, the preference order from a second BS that makes inter-cell cooperation, and approving, by the second BS, the request.

Advantageous Effects

Because scheduling is performed through an inter-cell cooperation, an inter-cell interference can be reduced. In particular, scheduling can be performed simply by exchanging signals without a central scheduler.

BRIEF DESCRIPTION OF DRAWINGS

FIG. 1 illustrates a wireless communication system in a multi-cell environment.

FIG. 2 is a flow chart illustrating the process of a centralized scheduling scheme.

FIG. 3 is a flow chart illustrating the process of a distributed scheduling scheme.

FIG. 4 is a flow chart illustrating the process of a method of scheduling based on an inter-cell cooperation according to one exemplary embodiment of the present invention.

FIG. 5 shows an example of a downlink transmission in a multi-cell environment.

FIG. 6 is a flow chart illustrating a method of scheduling according to an inter-cell cooperation for downlink transmission according to an exemplary embodiment of the present invention.

FIG. 7 illustrates an example of uplink transmission in a multi-cell environment.

FIG. 8 is a flow chart illustrating the process of a method of scheduling according to an inter-cell cooperation for uplink transmission according to an exemplary embodiment of the present invention.

FIG. 9 is a flow chart illustrating the process of a method of scheduling based on an inter-cell cooperation according to another exemplary embodiment of the present invention.

MODE FOR THE INVENTION

FIG. 1 illustrates a wireless communication system in a multi-cell environment.

With reference to FIG. 1, the wireless communication system includes a base station (BS) 20, and one or more mobile stations (MSs) 10. The wireless communication system may be an OFDM (Orthogonal Frequency Division Multiplexing)/OFDMA (Orthogonal Frequency Division Multiple Access)-based system. OFDM uses a plurality of orthogonal subcarriers. The OFDM uses orthogonality between IFFT (inverse fast Fourier Transform) and FFT (fast Fourier Transform). A transmitter performs IFFT on data and transmits the same. A receiver performs FFT on a reception signal to restore the original data. The transmitter uses IFFT to combine a plurality of subcarriers, and the receiver uses corresponding FFT to split the multiple subcarriers. In downlink, the transmitter may be part of the BS 20, and the receiver may be part of the MS 10. In uplink, the transmitter may be part of the MS 10, and the receiver may be part of the BS 20.

One or more cells may exist in the BS 20. A cell refers to an area to which the single BS 20 provides a communication service. Multiple cells may be formed as a plurality of BSs each having at least one cell are disposed. A BS providing a communication service to the MS 10 is called a serving BS, and a BS adjacent to the serving BS is called a neighbor BS. A cell of the serving BS is called a serving cell, and a cell of the neighbor BS is called a neighboring cell.

It is assumed that a BS A 20-A provides a communication service to a MS A 10-A, and a BS B 20-B provides a communication service to a MS B 10-B. With respect to the MS A 10-A, the BS A 20-A is a serving BS and the BS B 20-B is a neighbor BS. With respect to the MS B 10-B, the BS B 20-B is a serving BS and the BS A 20-A is a neighbor BS. It is assumed that the MS A 10-A and the MS B 10-B are located at the boundary of their serving cell. The BS A 20-A allocates radio resource to the MS A 10-A through scheduling and transmits downlink (DL) data. The DL data transmitted by the BS B 20-B may be received by the MS A 10-A as well as by the MS B 10-B. Then, the DL data from the BS B 20-B may work as a heavy interference with the MS A 10-A. The MS A 10-A transmits uplink (UL) data through the allocated radio resource. The UL data transmitted by the MS A 10-A may be received by the BS B 20-B as well as by the BS A 20-A. Then, the UL data from the MS A 10-A may work as a heavy interference with the BS B 20-B. The OFDMA system has orthogonality in a frequency domain in the same cell, so MSs using different frequency bands do not cause interference with each other. However, orthogonality is not maintained between MSs using the same frequency band in neighboring cells, so the MSs may cause interference with each other. When the BS A 20-A and the BS B 20-B cooperate with each other, the antennas positioned in each BS operate in consideration of MSs located in other cells. Namely, it can be a multi-antenna system in which the antennas are dispersed in several cells. Thus, the scheme in which the BS A 20-A and the BS B 20-B cooperate may be called a multi-cell cooperative scheme.

In the multi-cell cooperative scheme, BSs may perform a centralized scheduling scheme and a distributed scheduling scheme.

FIG. 2 is a flow chart illustrating the process of the centralized scheduling scheme.

With reference to FIG. 2, the BS 1 and the BS 2 are mutually adjacent BSs (i.e., neighboring BSs). A central scheduler performs scheduling by exchanging signals with the respective BSs. It is illustrated that the BS 1 and the BS 2 are controlled by the single central scheduler, but the present invention is not meant to be limited thereto. Namely, two or more BSs may be controlled by the single central scheduler.

The BS 1 transmits channel and traffic request information from MSs located within the cell of the BS 1 to the central scheduler, and the BS 2 transmits channel and traffic request information from MSs located within the cell of the BS 2 to the central scheduler (S100).

The central scheduler performs scheduling in consideration of the channel and traffic request information from the MSs, which have been received from the BS 1 and BS 2 (S110). Namely, the central scheduler selects MSs served within each cell.

The central scheduler selects a beamforming matrix suitable for the selected MSs (S120).

The central scheduler transmits information regarding the selected MSs and beamforming matrix to the BS 1 and the BS 2 (S130). The BS 1 and the BS2 transmit data to or receive data from the MSs based on the received information.

According to the centralized scheduling scheme, the central scheduler can collect all the information from the respective BSs. Thus, it can estimate what kind of interference the scheduling with respect to each MS causes to the neighboring cells. To this end, however, the central scheduler is required, a great deal of signal exchanges needs to be made between the BSs and the central scheduler, and performing scheduling in consideration of inter-cell interference is quite complicated.

FIG. 3 is a flow chart illustrating the process of the distributed scheduling scheme.

With reference to FIG. 3, the BS 1 and the BS 2 are neighboring BSs. According to the distributed scheduling scheme, each BS independently performs scheduling without the necessity of such a central scheduler as in the centralized scheduling scheme.

The BS 1 measures a channel state of the MSs located within the cell of the BS 1, and the BS 2 measures a channel state of the MSs located within the cell of the BS 2 (S200). The channel state may be indicated by a CQI (Channel Quality Indicator), an SNR (Signal to Noise Ratio), and an SINR (Signal and Interference to Ratio). The channel state may be included in feedback information of an MS with respect to data transmission of a BS.

The BS 1 performs intra-cell scheduling of the BS 1 and the BS 2 performs intra-cell scheduling of the BS 2 (S210). Namely, the BS 1 selects MSs served within the cell of the BS 1, and the BS 2 selects MSs served within the cell of the BS 2.

The BS 1 and the BS 2 exchange the intra-cell scheduling results (S220). Namely, the BS 1 transmits information regarding MSs selected to be served within the cell of the BS 1 to the BS 2, and the BS 2 transmits information regarding MSs selected to be served within the cell of the BS 2 to the BS 1.

The BS 1 selects a beamforming matrix in consideration of the scheduling results which have been received from the BS 2, and the BS 2 selects a beamforming matrix in consideration of the scheduling results which have been received from the BS 1 (S230). In this case, the BS 1 and the BS 2 may select a beamforming matrix that minimizes interference with respect to MSs located in mutually different cells, respectively. The BS 1 and the BS 2 may transmit data to or receive data from the MSs based on the scheduling results received in step S220 and the beamforming matrix selected in step S230.

According to the distributed scheduling scheme, only the minimum information is changed between the BSs, without the necessity of a central scheduler. Thus, the scheduling can be simply performed, compared with the centralized scheduling scheme. However, in the distributed scheduling scheme, MSs to be served are selected without considering neighboring cells in the intra-cell scheduling process in step S210, which may lower the effect of the inter-cell cooperation. For example, it is assumed that, in step S210, the BS 1 selects the MS 1-A and the BS 2 selects the MS 2-A for downlink transmission. If the BS 2 causes much interference with the MS 1-A due to a beamforming matrix that maximizes a reception performance of the MS 2-A, the BS 2 must select another beamforming matrix, not the beamforming matrix, resulting in the degradation of the reception performance of the MS 2-A.

Thus, a method for effectively performing scheduling through proper signal exchanging between cells without a central scheduler according to the distributed scheduling scheme is required.

FIG. 4 is a flow chart illustrating the process of a method of scheduling based on an inter-cell cooperation according to one exemplary embodiment of the present invention.

It is illustrated that the BS 1, the BS 2, and a BS 3 are participating in a cooperation for the sake of brevity, but the present invention is not meant to be limited thereto. At least two BSs may participate in the cooperation, and the plurality of BSs may appropriately perform scheduling according to the method illustrated in the present invention. It is assumed that the scheduling order of the plurality of BSs participating in the cooperation is previously determined. In the following description, it is assumed that scheduling is performed in the order starting from BS 1, the BS 2, and the BS 3.

With reference to FIG. 4, the BS 1, the BS 2, and the BS 3 measure a channel state of MSs located in each cell of them (S300). The channel state may be indicated by a CQI (Channel Quality Indicator), an SNR (Signal to Noise Ratio), and an SINR (Signal and Interference to Ratio). The channel state may be included in feedback information of a MS with respect to data transmission of a BS.

The BS 1 performs intra-cell scheduling in consideration of the channel state (S310). Namely, the BS 1 selects MSs to be served from among MSs located within the cell of the BS 1. The BS 1 selects a beamforming matrix suitable for each of the MSs selected in step S310. The performing of the intra-cell scheduling and the selecting of the beamforming matrix may be collectively called scheduling.

The BS 1 transmits the scheduling results of the BS 1 to the BS 2 (S330). The scheduling results may include certain information required for the BSs to sequentially perform scheduling. In detail, the scheduling results may include information regarding the MSs selected in step S310 and/or information regarding beamforming matrix selected in step S320.

The BS 2 performs intra-cell scheduling in consideration of the channel state measured in step S300 and the information received in step S330 (S340), and selects an appropriate beamforming matrix (S350). The BS 2 may estimate the size of interference with the respective MSs located within the cell of the BS 2 made by the BS 1 by using the channel state measured in step S300. Also, the BS 2 may calculate the range of a beamforming matrix that can reduce the interference with the MSs selected in step S310. Based on the obtained results, the BS 2 may select MSs suitable to be served among the MSs located within the cell of the BS 2 and selects a beamforming matrix suitable for the selected MSs.

The BS 2 transmits the scheduling results of the BS 2 to the BS 3 (S360). The scheduling results may include certain information required for the BSs to sequentially perform scheduling. In detail, the scheduling results may include information regarding the MSs selected in step S340 and the beamforming matrix selected in step S350. Here, the BS 2 may further include information which has been received from the BS 1, and transmit the same to the BS 3.

The BS 3 performs intra-cell scheduling in consideration of the channel state measured in step S300 and the information received in step S360 (S370), and selects an appropriate beamforming matrix (S380).

The BS 1, the BS 2, and the BS 3 may transmit data to or receive data from the MSs based on the scheduling results, respectively.

Accordingly, the scheduling method minimizing the inter-cell interference through the simple signal exchanging between the neighboring cells can be obtained. A method of scheduling in case of downlink transmission and uplink transmission will now be described as follows.

FIG. 5 shows an example of a downlink transmission in a multi-cell environment.

With reference to FIG. 5, it is illustrated that the BS 1 and the BS 2 are participating in a cooperation. The mobile station (MS) 1 is located within the cell of the BS 1, and the MS 2 and the MS 3 are located within the cell of the BS 2. The MS 1, the MS 2, and the MS 3 are located at the cell boundaries, respectively.

It is assumed that the MS 1 is selected as a terminal to be served in a downlink transmission according to the intra-cell scheduling of the BS 1 and a transmission beamforming matrix is selected for the downlink transmission to the MS 1. If the BS 2 selects the MS 2 and a transmission beamforming matrix for its downlink transmission to the MS 2, the cell of the BS 1 and that of the BS 2 may heavily interfered with each other. Meanwhile, if the BS 2 selects the MS 3 and a transmission beamforming matrix for its downlink transmission to the MS3, the cell of the BS 1 and that of the BS 2 could be less interfered with by the neighboring cells, respectively.

FIG. 6 is a flow chart illustrating a method of scheduling according to an inter-cell cooperation for downlink transmission according to an exemplary embodiment of the present invention.

With reference to FIG. 6, the BS 1 measures a channel state by using information fed back from MSs located within the cell of the BS 1 (S400). The BS 1 performs intra-cell scheduling based on the channel state (S410). Namely, the BS 1 selects a MS for its downlink transmission. The BS selects a transmission beamforming matrix for its downlink transmission to the selected MS (S420). Hereinafter, the performing of the intra-cell scheduling and the selecting of the transmission beamforming matrix will be collectively called scheduling.

The BS 1 transmits the scheduling results to the BS 2 (S430). The scheduling results may include certain information required for the BSs to sequentially perform scheduling. For example, the scheduling results may include information regarding the MSs selected in step S410 and/or information regarding the transmission beamforming matrix selected in step S420. Also, the scheduling results may further include information for the BS 2 to select a transmission beamforming matrix. Namely, the BS 1 may transmit information regarding a transmission beamforming matrix desired to be selected by the BS 2 or information regarding a transmission beamforming matrix desired not to be selected by the BS to the BS 2. For example, in FIG. 5, in the case where the BS 1 selects the MS 1 and the transmission beamforming matrix for its downlink transmission to the MS 1, if the BS 2 selects the transmission beamforming matrix for its downlink transmission to the MS 2, the cell of the BS 1 would be heavily interfered with by the cell of the BS 2. Meanwhile, if the BS 2 selects a transmission beamforming matrix for its downlink transmission to the MS 3, the cell of the BS 1 may not be interfered with by the cell of the BS 2. Thus, the BS 1 can inform the BS 2 that the transmission beamforming matrix for the downlink transmission to the MS 2 is an inappropriate transmission beamforming matrix or inform the BS 2 that the transmission beamforming matrix for the downlink transmission to the MS 3 is an appropriate transmission beamforming matrix. The information for the BS 2 to select beamforming matrix may be determined in consideration of the channel state between the MS selected by the BS 1 and the BS 2.

The BS 2 performs scheduling by using the scheduling results of the BS 1 which have been received from the BS 1 and the channel state with respect to each MS located within the cell of the BS 2 (S440). Based on the scheduling results received from the BS 1 in step S430, the BS 2 can recognize the degree of interference of the transmission beamforming matrix selected by the BS 1 with the MSs located in the cell of the BS 2. Thus, the BS 2 may select an MS less interfered with by the BS 1. Also, because the BS 2 can recognize which MS and which transmission beamforming matrix it should select, the interference with the cell of the BS 1 can be reduced. Thus, the BS 2 can select an MS and transmission beamforming matrix that can less interfere with the cell of the BS 1.

At the position of the BS 2, the BS 2 can perform scheduling such that it is less interfered with by the cell of the BS 1 while it less interferes with the cell of the BS 1. Also, at the position of the BS 1, the BS 1 may forecast that the BS 2 will perform scheduling toward reducing an inter-cell interference. Thus, the BS 1 can freely set the level of a modulation and coding scheme with respect to its selected MS, and accordingly, it can obtain a high transmission rate.

FIG. 7 illustrates an example of uplink transmission in a multi-cell environment.

With reference to FIG. 7, it is illustrated that the BS 1 and the BS 2 are participating in the cooperation. The MS 1 is located within the cell of the BS 1, and the MS 2 and the MS 3 are located within the cell of the BS 2. The MS 1, the MS 2, and the MS 3 are located at the cell boundaries, respectively.

It is assumed that the MS 1 is selected as a terminal for an uplink transmission according to intra-cell scheduling of the BS 1, and a reception beamforming matrix for receiving the uplink transmission from the MS 1 is selected. The MS 2 located within the cell of the BS 2 has a high channel correlation with the MS 1. Thus, if the BS 2 selects the MS 2 as a terminal for an uplink transmission according to its intra-cell scheduling and uplink transmission is performed at the same time and frequency domain as those of the MS 1, the inter-cell interference would be significantly increased. Meanwhile, if the BS 2 selects the MS 3, the inter-cell interference can be reduced.

FIG. 8 is a flow chart illustrating the process of a method of scheduling according to an inter-cell cooperation for uplink transmission according to an exemplary embodiment of the present invention.

With reference to FIG. 8, the BS 1 measures a channel state by using information fed back from MSs located within the cell of the BS 1 (S500). The BS 1 performs intra-cell scheduling based on the channel state (S510). Namely, the BS 1 selects an MS that performs uplink transmission. Next, the BS 1 selects a reception beamforming matrix for receiving the uplink transmission from the selected MS (S520). Hereinafter, the performing of the intra-cell scheduling and the selecting of the reception beamforming matrix will be collectively called scheduling.

The BS 1 transmits the scheduling results to the BS 2 (S530). The scheduling results include certain information required for the BSs to sequentially perform scheduling. For example, the scheduling results may include information for the BS 2 to select an MS. Namely, the BS 1 may transmit a list of MSs desired to be selected by the BS 2 to the BS 2, or may transmit a list of MSs desired not to be selected by the BS 2. In the example illustrated in FIG. 7, in the case where the BS 1 selects the MS 1 and the reception beamforming matrix for receiving the uplink transmission from the MS 1, if the BS 2 selects the MS 2 and the MS 2 performs uplink transmission at the same time and frequency domains as those of the MS 1, the cell of the BS 1 would be heavily interfered with. Thus, the BS 1 may request the BS 2 not to select the MS 2.

In order to transmit the list of MSs desired to be selected by the BS 2 or the list of MSs desired not to be selected by the BS 2, the MS 1 must know about the channel state between the MSs located within the cell of the BS 2 and the BS 1. To this end, the BS 1 may measure the size of uplink interference signals of the MSs located within the cell of the BS 2 and store the information regarding the MSs with the interference signals with a size larger than a threshold value. Here, the information regarding the MSs may include an MS ID, a reference signal ID, channel information, a signal arrival direction, and the like. Here, the reference signal may be an SRS (Sounding Reference Signal), an uplink demodulation reference signal, and the like.

In order to determine the list of MSs desired not to be selected by the BS 2, the BS 1 may calculate a channel correlation with the MSs selected in step S510 in consideration of the information regarding the MSs, and select the MSs that may cause degradation of performance beyond a certain range when it performs scheduling on the same resource at that of the MSs selected in step S510.

The BS 2 performs scheduling by using the scheduling results of the BS 1 received from the BS 1 and the channel state regarding each MS within the cell of the BS 2 (S540). In the example illustrated in FIG. 7, if the BS 1 select the MS 1 and the reception beamforming matrix for receiving the uplink transmission from the MS 1, and instruct the BS 2 not to select the MS 2, the BS 2 may select an appropriate MS from among the other remaining MSs than the MS 2, and select the reception beamforming matrix for receiving an uplink transmission from the selected MS.

At the position of the BS 2, the BS 2 can perform scheduling such that it is less interfered with by the cell of the BS 1 while it less interferes with the cell of the BS 1. Also, at the position of the BS 1, the BS 1 may forecast that the BS 2 will perform scheduling toward reducing an inter-cell interference. Thus, the BS 1 can freely set the level of a modulation and coding scheme with respect to its selected MS, and accordingly, it can obtain a high transmission rate.

In the above description, it is assumed that when the plurality of cells are participating in the cooperation, the scheduling order of the BSs has been already determined. Hereinafter, a method of performing scheduling in case where the scheduling order of the BSs has not been determined will now be described.

FIG. 9 is a flow chart illustrating the process of a method of scheduling based on an inter-cell cooperation according to another exemplary embodiment of the present invention.

It is illustrated that the BS 1, the BS 2, and the BS 3 are participating in a cooperation for the sake of brevity, but the present invention is not meant to be limited thereto. At least two BSs may participate in the cooperation, and the plurality of BSs may appropriately perform scheduling according to the method illustrated in the present invention.

With reference to FIG. 9, the BS 1, the BS 2, and the BS 3 determine the scheduling order (S600). The scheduling order may be determined to be changed periodically over time. Namely, scheduling may be performed in a first scheduling order during a first period, and scheduling may be performed in a second scheduling order during a second period. For example, the scheduling order may be changed over time according to a cyclic shifting method. Namely, scheduling may be performed in the scheduling order starting from the BS 1, the BS 2, and the BS 3 during the first period, scheduling may be performed in the scheduling order starting from the BS 2, the BS 3, and the BS 1 during the second period, scheduling may be performed in the scheduling order starting from the BS 3, the BS 1, and the BS 2 during a third period.

The scheduling order may be determined in consideration of a traffic load. For example, if the traffic load of the BS 1 is large, scheduling may be performed in the order starting from the BS 1, the BS 2, and the BS 3 during the first and second periods, scheduling may be performed in the order starting from the BS 2, the BS 3, and a BS 4 during the third period, and scheduling may be performed in the order starting from the BS 3, the BS 1, and the BS 2 during a fourth period.

The scheduling order may be determined in consideration of the preference order of each BS. Namely, a particular BS may request temporarily positioning at the front in the scheduling order from other BSs participating in the cooperation, and the other BSs may approve it. For example, in case of the period during which the scheduling order starts from BS 1, the BS 2, and the BS 3, if the BS 2 requests its positioning first in the scheduling order from the BS 1 and the BS 3 and the BS 1 and the BS 3 approve it, the scheduling order may start from the BS 2, the BS 1, and the BS 3.

The plurality of BSs sequentially perform scheduling according to the scheduling order determined in step S600 (S610). In this case, a BS coming later in the scheduling order may perform scheduling by using the scheduling results of a BS coming before it in the scheduling order. For example, as illustrated in FIG. 4, if scheduling is performed in the order starting from BS 1, BS 2, and BS 3, the BS 2, which has received the scheduling results of the BS 1, may perform scheduling with reference to the scheduling results of the BS 1. Also, the BS 3, which has received scheduling results of the BS 2, may perform scheduling with reference to the scheduling results of the BS 2.

In general, the BS coming earlier in the scheduling order can perform scheduling without a restriction, but the BS coming later in the scheduling order performs scheduling dependently on the scheduling results of the BS coming before it. If the scheduling order is changed over time, the BSs participating in the cooperation may equally perform scheduling.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of scheduling in a multi-cell cooperative wireless communication system, the method comprising:
   performing scheduling; and
   transmitting scheduling results,
   wherein the scheduling results comprise certain information for scheduling to be sequentially performed among base stations (BS), the certain information comprising a list of mobile stations (MS) desired not to be selected by a neighbor BS,
   wherein the list of mobile stations is determined by:
   measuring an uplink interference signal of a MS belonging to a neighboring cell;

storing information of an MS having an interference signal with a size larger than a threshold value, and calculating a channel correlation with an MS selected when performing the scheduling, the channel calculated by using the stored information of the MS; and selecting an MS that may cause degradation of performance beyond a certain range if scheduling is performed on the same resource as the resource of the MS selected when performing the scheduling.

2. The method of claim 1, wherein the certain information further comprises information of a beamforming matrix related to the MS selected when performing the scheduling.

3. The method of claim 2, wherein the certain information further comprises information of a beamforming matrix desired to be selected by the neighbor BS.

4. The method of claim 2, wherein the certain information further comprises information of a beamforming matrix desired not to be selected by the neighbor BS.

5. The method of claim 1, wherein the information of the MS comprises a mobile station ID, a reference signal ID, channel information, or a signal arrival direction.

* * * * *